(No Model.)
A. W. JOHNSON.
RUNNING GEAR FOR VEHICLES.
No. 384,366. Patented June 12, 1888.
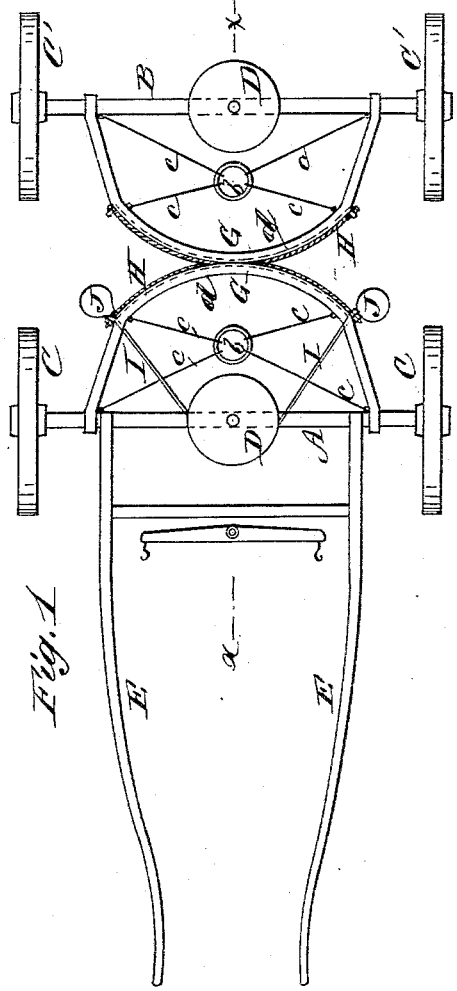
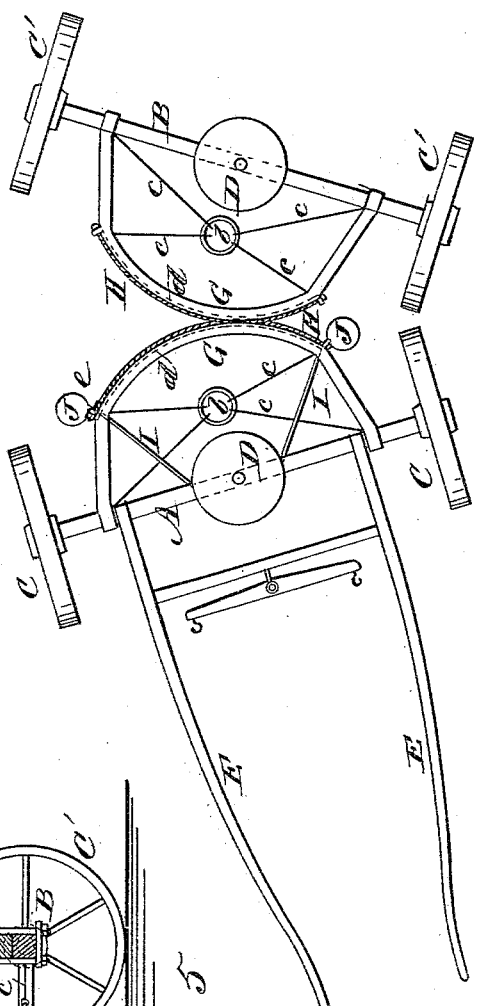
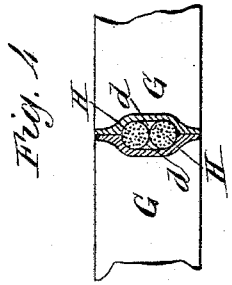
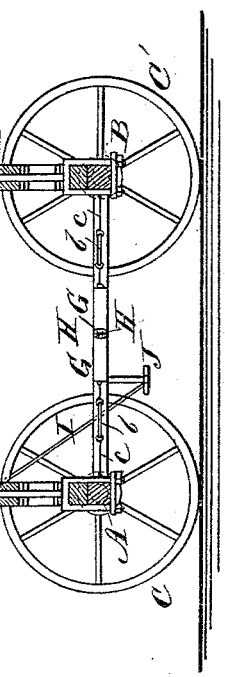
WITNESSES:
C. Neveux
C. Sedgwick
INVENTOR:
A. W. Johnson
BY Munn & Co.
ATTORNEYS.

UNITED STATES PATENT OFFICE.

ALFRED W. JOHNSON, OF NEW BRUNSWICK, NEW JERSEY.

RUNNING-GEAR FOR VEHICLES.

SPECIFICATION forming part of Letters Patent No. 384,366, dated June 12, 1888.

Application filed September 30, 1887. Serial No. 251,124. (No model.)

*To all whom it may concern:*

Be it known that I, ALFRED W. JOHNSON, of New Brunswick, in the county of Middlesex and State of New Jersey, have invented certain new and useful Improvements in the Running-Gear of Wagons and other Vehicles, of which the following is a full, clear, and exact description.

This invention is applicable to all four-wheeled carriages or draft-vehicles, including children's carriages; but it is especially valuable as applied to wagons or carriages such as used on common roads or on farms for carrying either persons or commodities. Any suitable vehicle-body may be mounted on or be used in connection with it.

The invention relates to devices connected with and connecting the front and rear axles of a vehicle, both of which are fitted to swivel or turn centrally of their length, whereby greater flexibility is given to the vehicle, and the wheels on the two axles are made to skew in common when turning the vehicle, the axles carrying the wheels simultaneously swiveling in opposite directions.

The invention consists in certain novel combinations and arrangements of means for the purpose above named, substantially as hereinafter described, and pointed out in the claims.

Reference is to be had to the accompanying drawings, forming part of this specification, in which similar letters of reference indicate corresponding parts in all the figures.

Figure 1 represents a plan view of the running-gear of a wagon embodying my invention, with the parts in position when the draft is in a straight line or course. Fig. 2 is a further plan with the parts in position when the vehicle is being turned or is running in a curved course. Fig. 3 is a vertical section upon the line *x x* in Fig. 1. Fig. 4 is a vertical section, upon a larger scale, through the coupled segments in part, and showing their flexible coupling-connections. Fig. 5 is a plan view of one of the segments in part, with coupling rope or connection and means of tightening the same.

A and B are the two axles of the vehicle, either of which may be the front one when their respective wheels C C' are of the same size, the running-gear being similar both front and back—that is, each axle being fitted to skew or turn on a center bearing or fifth-wheel, D; but, as shown in the drawings, the axle A, having the shafts E attached to it, is the front one. The order, however, might be reversed, and the horse or horses, if a pole be substituted for the shafts, be hitched to the other end of the running-gear and the vehicle-body be arranged to suit. Each axle A B has secured to it a segment, G, arranged to face one another on their curved surfaces, with which the fifth-wheels D D are concentric. These segments, for lightness' sake, are of skeleton construction, being made with an eye or ring, *b*, from which radiate arms *c;* but said segments might be made solid or close and hollow. They are arranged in contact with one another on their curved surfaces, as they thereby serve to support and steady one another. Said segments are connected with one another by wire ropes, chains, or other flexible cord or band-like connections, H H, arranged to work within grooves *d* in the curved marginal portions of the segments, and secured, respectively, at their opposite ends in a reverse or crossing manner to the two segments—that is, at their one end to the one segment on one side of its center, and at their other end to the other segment on the opposite side of its center, relatively to a straight line intersecting the two centers. These segments are of like radius or sweep when the running-wheels C C' are of the same diameter. When said wheels are of a different diameter, then said segments will be of a corresponding difference in radius or sweep. It is preferred, however, for reasons hereinafter given, to make the front and rear wheels, C C', of equal size, and the segments G G of the same sweep one with another, and in further description this will be presumed to be the arrangement.

If desired, the fifth-wheels D D of the two axles may be connected by a bar or rod; but such is not absolutely necessary, and, though strengthening, would add to the weight of the running-gear; but either segment may be stayed from sagging partly by their rolling one on or against the other, and in part by rods I I, extending down from the fifth-wheel or swiveling-connection of the axle carrying said segment to the outer extremities of the segment, and from thence, if desired, further extended downward to carry a step or steps, J. In the drawings the stay-rods I I are shown as connected with the segment by or through the steps.

It is very desirable that the ropes or flexible connections H H should be kept or held taut. To this end each of said connections is secured at one at least of its ends by an adjustable tightening device to either one of the segments—as, for instance, by an externally-screw-threaded tubular rope-holder, $e$, passing through a projection, $f$, on the segment and adjustable by a nut, $g$. By this construction of the running-gear and arrangement of its parts it will be seen that when one axle is at right angles to a straight line of draft the other axle is also at right angles thereto, as shown in Fig. 1, and that when the front axle is turned to an oblique position with said line of draft, as in turning the vehicle to either side or traveling round a curve, the rear axle is also turned in harmony to a reverse oblique position, as shown in Fig. 2, and so that the front and rear wheels, C C', act harmoniously together and the wagon can be turned round in a very small space as compared with an ordinary wagon; and when the front and rear wheels are of the same size they both will run in the same track or rut, whether traveling in a straight or curved course, thus greatly easing the draft. Furthermore, small obstructions or inequalities in the road do not cause the front wheels to squirm or wriggle, as they are held to their places by the hind wheels, and the pole or shafts are restrained from striking the horse, and the wagon runs steadier. The wagon, too, may be built lighter than ordinary wagons, as in rounding curves all the running-wheels may be made to travel in the same track, instead of the front wheels in one track and the rear wheels in another, which causes an extremely heavy strain on the connections of the two axles, and in cases of reckless driving or the horses running away causes the vehicle to upset in turning corners at a high rate of speed. Large wheels, which run easier than small ones, may likewise be used with a low wagon-body and yet be enabled to turn short without sluing or swinging of the vehicle. Again, the draft on the horse will be easier, as the wagon will run truer and steadier, and increased facility or space between the front and rear wheels will be afforded for getting in and out of the vehicle without soiling the clothes or person. The wagon, too, may be backed or put into a smaller space when being housed. In this turning connection of the front and rear axles the ropes or flexible connections H H between the segments G G not only run free and smooth or easy, exempt from all jar, but they admit, by yielding or flexing, to adapt the vehicle to slopes or inequalities in the road, which cause the wheel or wheels on the one side of the vehicle to be raised or depressed relatively to the wheel or wheels on the other side of the vehicle.

The practicability of the whole device is due in a large measure to the arrangement of the segments herein shown and described, whereby they are made to roll one over or against and steady the other.

Having thus described my invention, what I claim as new, and desire to secure by Letters Patent, is—

1. In the running-gear of wagons and other vehicles having centrally-pivoted and swiveling axles united with each other by segments and attached crossing ropes or flexible connections, the segments G G, arranged to roll over and work in contact with one another, whereby said segments are mutually made to support and steady each other, substantially as specified.

2. In the running-gear of wagons and other vehicles, the combination, with the front and rear axles, A B, their fifth-wheels or swiveling-connections D D, the segments G G, and the flexible connections H H, of the stay-rods I I, connecting either swiveling-connection or fifth-wheel with the segment on the axle to which said fifth-wheel belongs, and the step J, substantially as shown and described.

ALFRED W. JOHNSON.

Witnesses:
NORTON W. MORRIS,
JOHN C. MYERS.